(12) United States Patent
Yeom (10) Patent No.: US 12,049,261 B2
(45) Date of Patent: Jul. 30, 2024

(54) STEER-BY-WIRE STEERING DEVICE (71) Applicant: HL MANDO CORPORATION, Gyeonggi-do (KR)

(72) Inventor: SeulKi Yeom, Gyeonggi-do (KR)

(73) Assignee: HL MANDO CORPORATION, Gyeonggi-Do (KR)

( * ) Notice: Subject to any disclaimer, the term of this patent is extended or adjusted under 35 U.S.C. 154(b) by 554 days.

(21) Appl. No.: 17/410,761

(22) Filed: Aug. 24, 2021

(65) Prior Publication Data

US 2022/0063706 A1 Mar. 3, 2022

(30) Foreign Application Priority Data

Aug. 25, 2020 (KR) .................. 10-2020-0106720

(51) Int. Cl.
*B62D 5/04* (2006.01)
*B62D 5/00* (2006.01)

(52) U.S. Cl.
CPC .......... *B62D 5/001* (2013.01); *B62D 5/0406* (2013.01)

(58) Field of Classification Search
CPC ...... B62D 5/001; B62D 5/0406; B62D 5/006; B62D 5/005; B62D 3/06; B62D 1/19; B62D 5/0424; B62D 5/0445; B62D 5/0463; B62D 15/0245

See application file for complete search history.

(56) References Cited

U.S. PATENT DOCUMENTS

| | | | |
|---|---|---|---|
| 2003/0164060 A1* | 9/2003 | Menjak ................. | B62D 5/006 74/552 |
| 2011/0127104 A1* | 6/2011 | Shibahata ............. | B62D 5/001 180/446 |
| 2013/0161116 A1* | 6/2013 | Tashiro ................. | B62D 5/001 180/446 |
| 2013/0161117 A1* | 6/2013 | Higashi ................. | B62D 5/001 180/446 |
| 2022/0097753 A1* | 3/2022 | Markfort ............... | B62D 5/006 |
| 2023/0174150 A1* | 6/2023 | Kim ....................... | B62D 5/006 701/41 |
| 2024/0092420 A1* | 3/2024 | Wang .................... | B62D 5/0412 |

* cited by examiner

*Primary Examiner* — Kevin Hurley
*Assistant Examiner* — Marlon A Arce
(74) *Attorney, Agent, or Firm* — Womble Bond Dickinson (US) LLP

(57) ABSTRACT

According to the embodiments, it is possible to provide the driver with a comfortable steering feel even with a low power motor, thereby reducing costs.

13 Claims, 8 Drawing Sheets

STEER-BY-WIRE STEERING DEVICE

CROSS-REFERENCE TO RELATED APPLICATION

This application claims priority from Korean Patent Application No. 10-2020-0106720, filed on Aug. 25, 2020, which is hereby incorporated by reference for all purposes as if fully set forth herein.

BACKGROUND

Field

The embodiments relate to a steer-by-wire steering device, and more specifically, to a steer-by-wire steering device that may provide the driver with a comfortable steering feel even with a low power motor, thereby reducing costs.

Description of Related Art

A steer-by-wire steering device is a kind of electromotive steering device that steers the vehicle using electric power without any mechanical connection, such as a steering column or universal joint, between the steering wheel and the front wheel steering device.

In other words, the driver's manipulation of the steering wheel is converted into an electric signal, and the electronic control device receives the electric signal and accordingly determines the output of the motor. Due to a lack of mechanical connection, the steer-by-wire system reduces injury to the driver by a mechanical part when a car crash occurs. Further, by saving parts, e.g., hydraulic parts and mechanical connections, the steer-by-wire system may lead to lightweight vehicles and a significant reduction in assembly line man-hour, thereby saving unnecessary energy consumption during steering and hence enhancing fuel efficiency. Further, it is possible to achieve ideal steering performance by ECU programming.

Due to lack of mechanical linkage between the steering shaft and the wheels, conventional steer-by-wire steering devices are unable to convey the sensation of weight, coming from wheel friction against the road or being stuck, to the driver and thus increase the user's steering feel by arbitrarily exerting a reaction force to the steering shaft.

Conventional steering devices provide steering reaction force to the driver by directly applying the torque from a motor to the steering shaft and thus require a motor with a certain level of output power or more although using a decelerator, such as a belt or a pulley. Thus, conventional steering devices are inappropriate for application to small electric vehicles or other affordable cars.

BRIEF SUMMARY

The embodiments have been conceived in the foregoing background and relate to a steer-by-wire steering device, and more specifically, to a steer-by-wire steering device that may provide the driver with a comfortable steering feel even with a low power, motor, thereby reducing costs.

According to the embodiments, there may be provided a steer-by-wire steering device, comprising a steering shaft connected with a steering wheel and having a lead screw, a nut coupled to the lead screw, a pair of first supporting members individually provided at opposite sides of the nut to be axially slidable, a pair of second supporting members axially spaced apart from opposite sides of the pair of first supporting members, with the pair of first supporting members disposed therebetween and provided to be axially slidable, an elastic member provided between adjacent ones of the first supporting members and the second supporting members, a stopper positioned between the pair of first supporting members and axially fixed, and a driver coupled with the second supporting members and axially sliding the second supporting members by control of an electronic control unit.

According to the embodiments, it is possible to provide the driver with a comfortable steering feel even with a low power motor, thereby reducing costs.

DESCRIPTION OF DRAWINGS

The above and other objects, features, and advantages of the present disclosure will be more clearly understood from the following detailed description, taken in conjunction with the accompanying drawings, in which.

DETAILED DESCRIPTION

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

Figure 1:
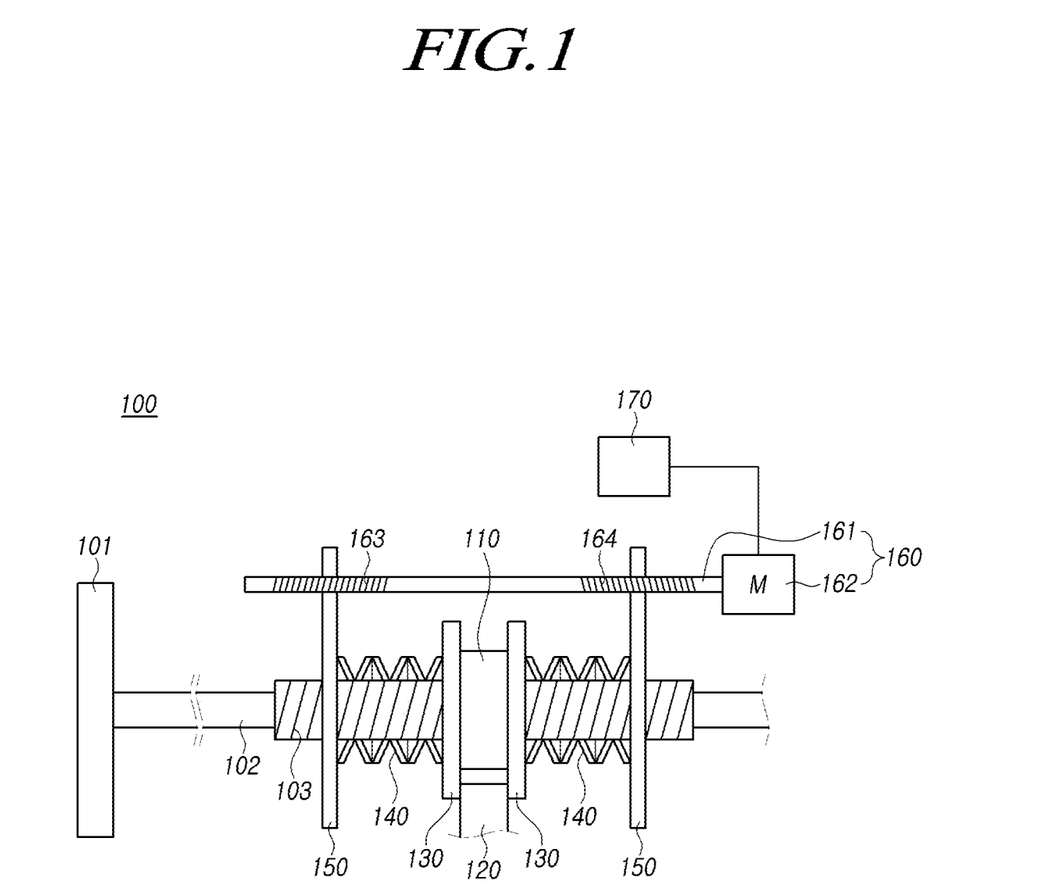
FIGS. 1 and 2 are views illustrating a steer-by-wire steering device according to the embodiments.
Figure 2:
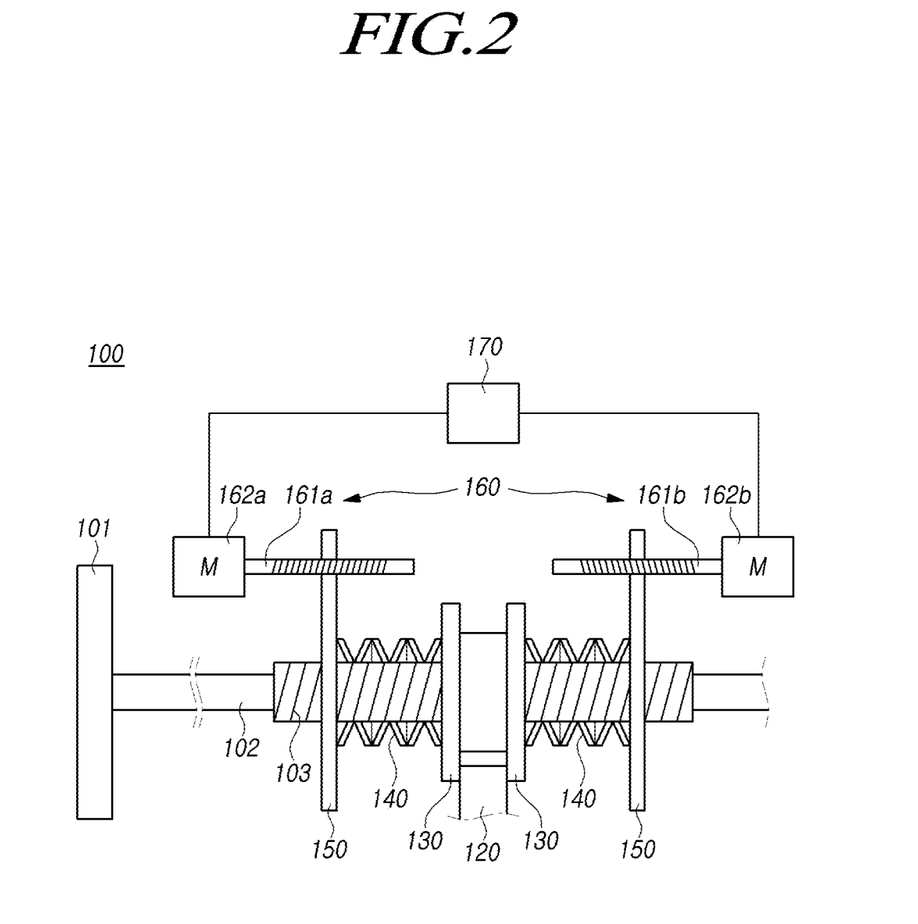
Figure 3:
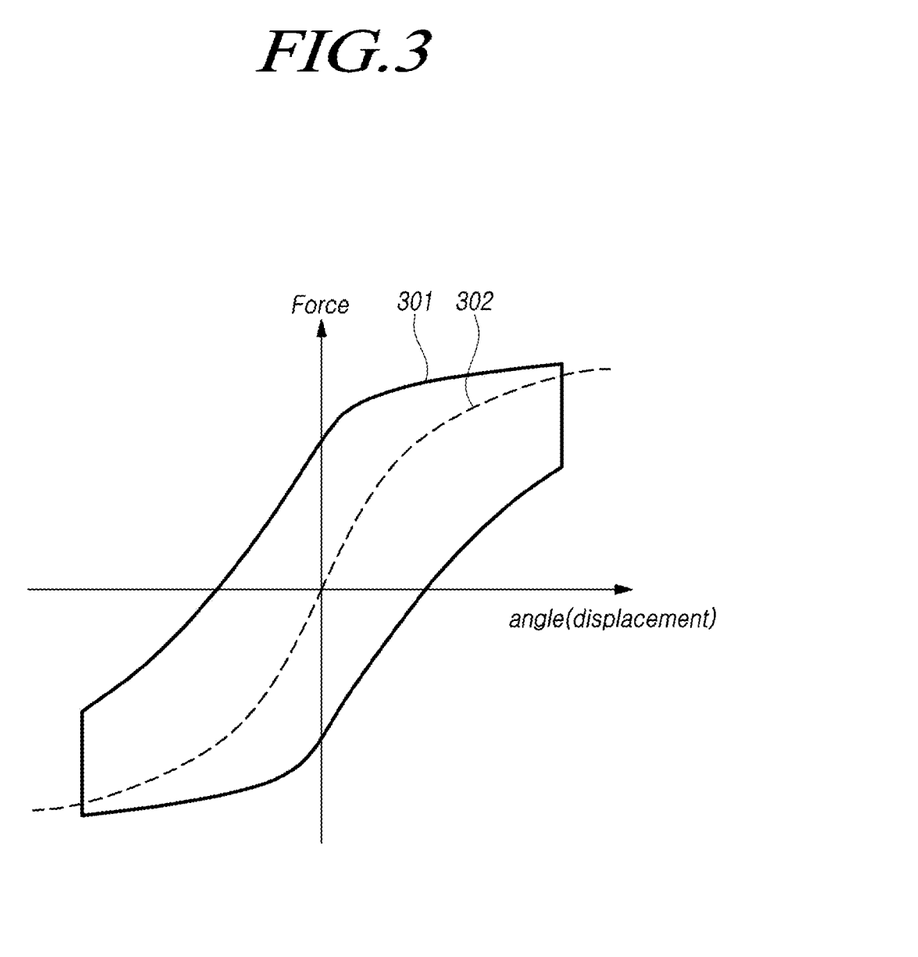
FIG. 3 is a graph illustrating comparison between the steering reaction force and the elastic force of a degressive rate spring in a conventional steering device.
Figure 4:
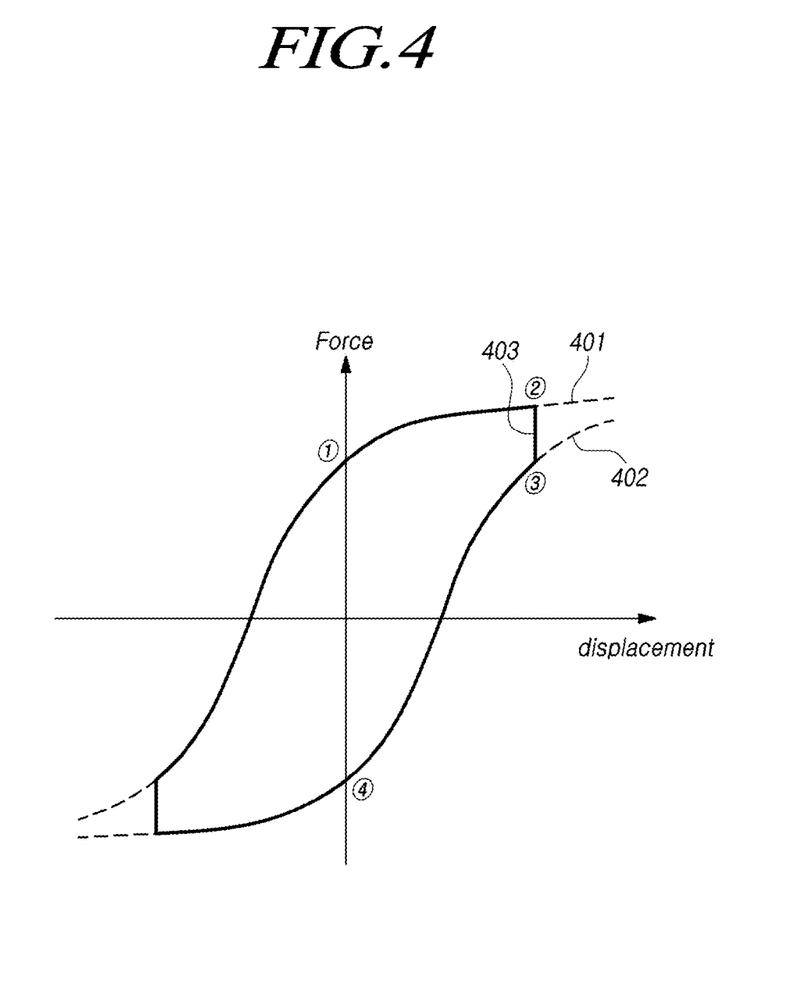
FIGS. 4, 5, and 6 are views illustrating a graph of the steering reaction force and operation states according to an operation example of a steer-by-wire steering device according to the embodiments.
Figure 5:
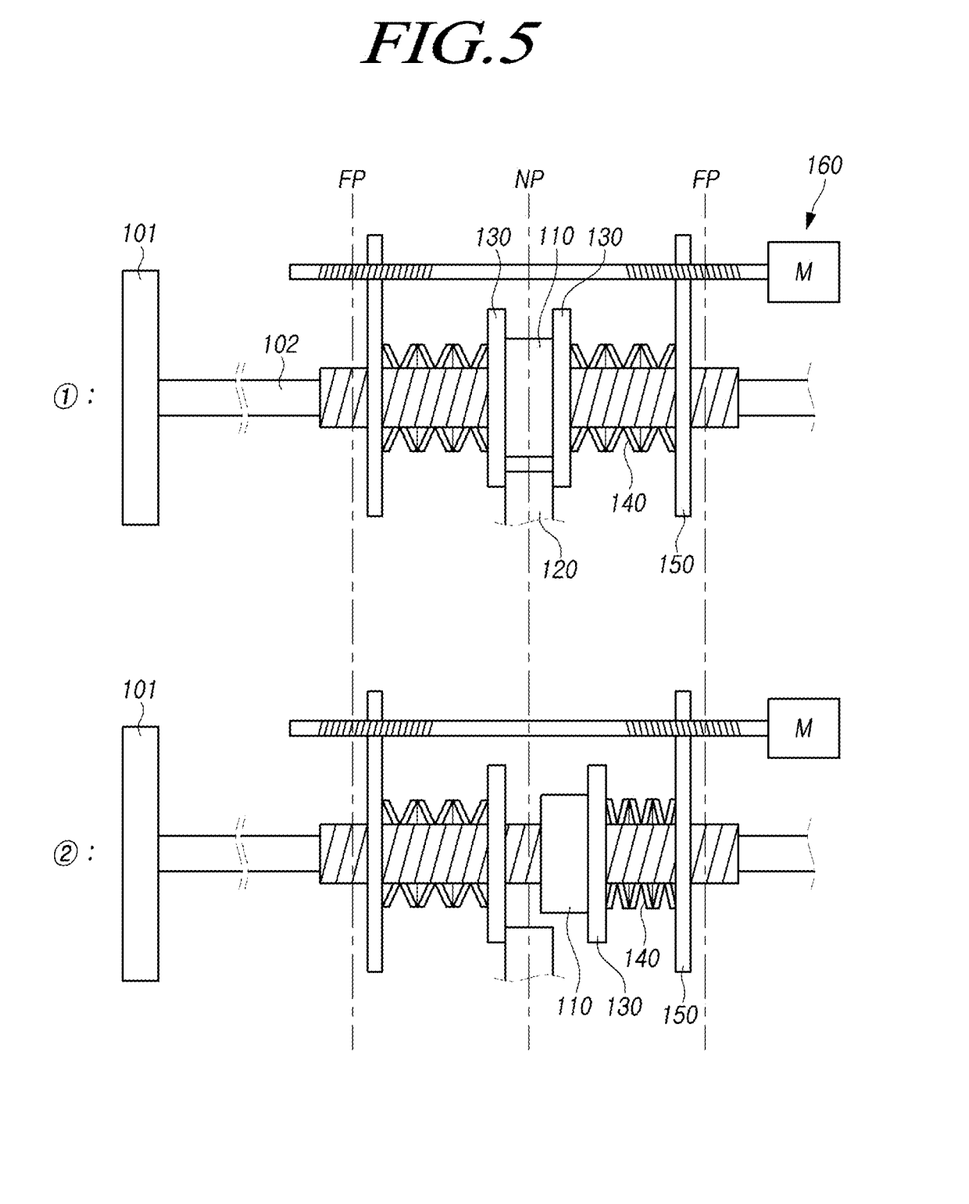
Figure 6:
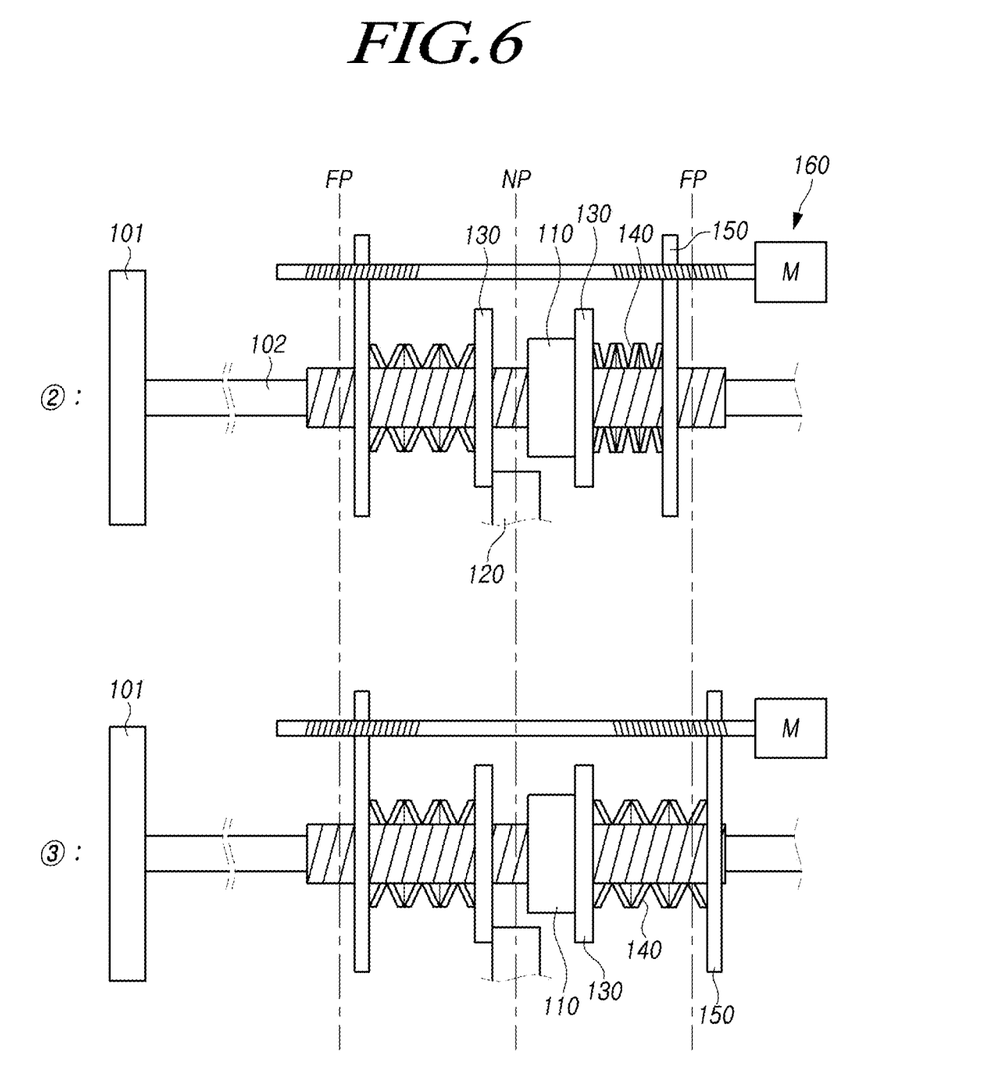
Figure 7:
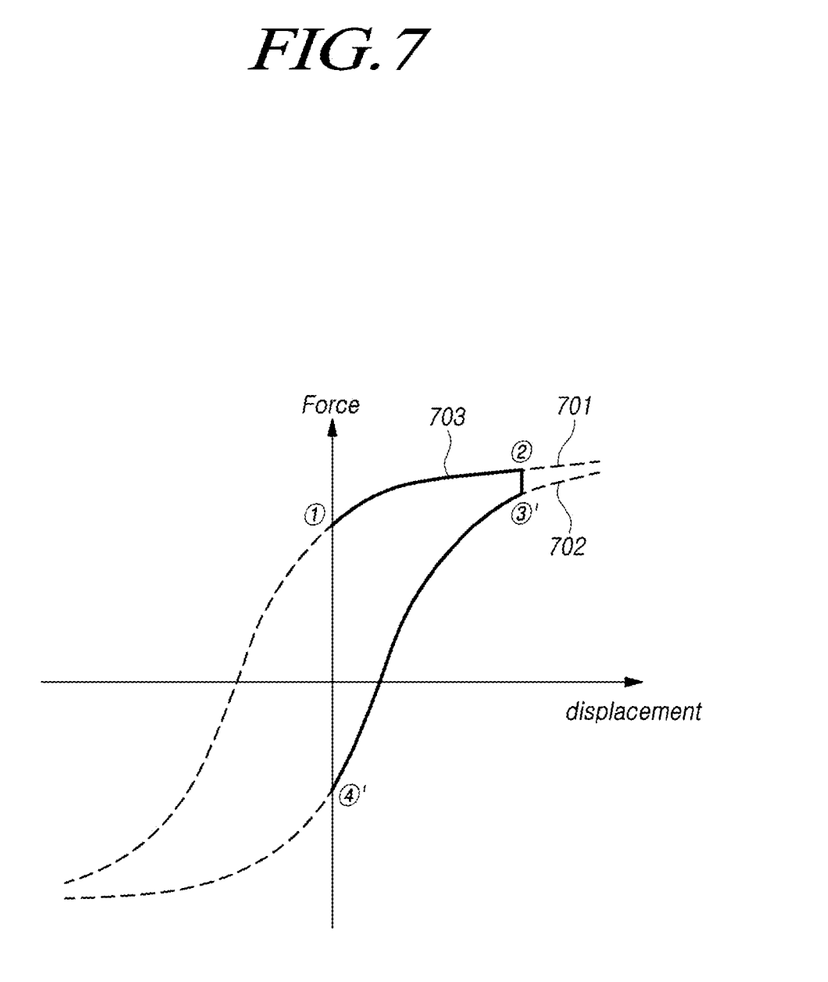
FIGS. 7 and 8 are views illustrating a graph of the steering reaction force and operation states according to an operation example of a steer-by-wire steering device according to the embodiments.
Figure 8:
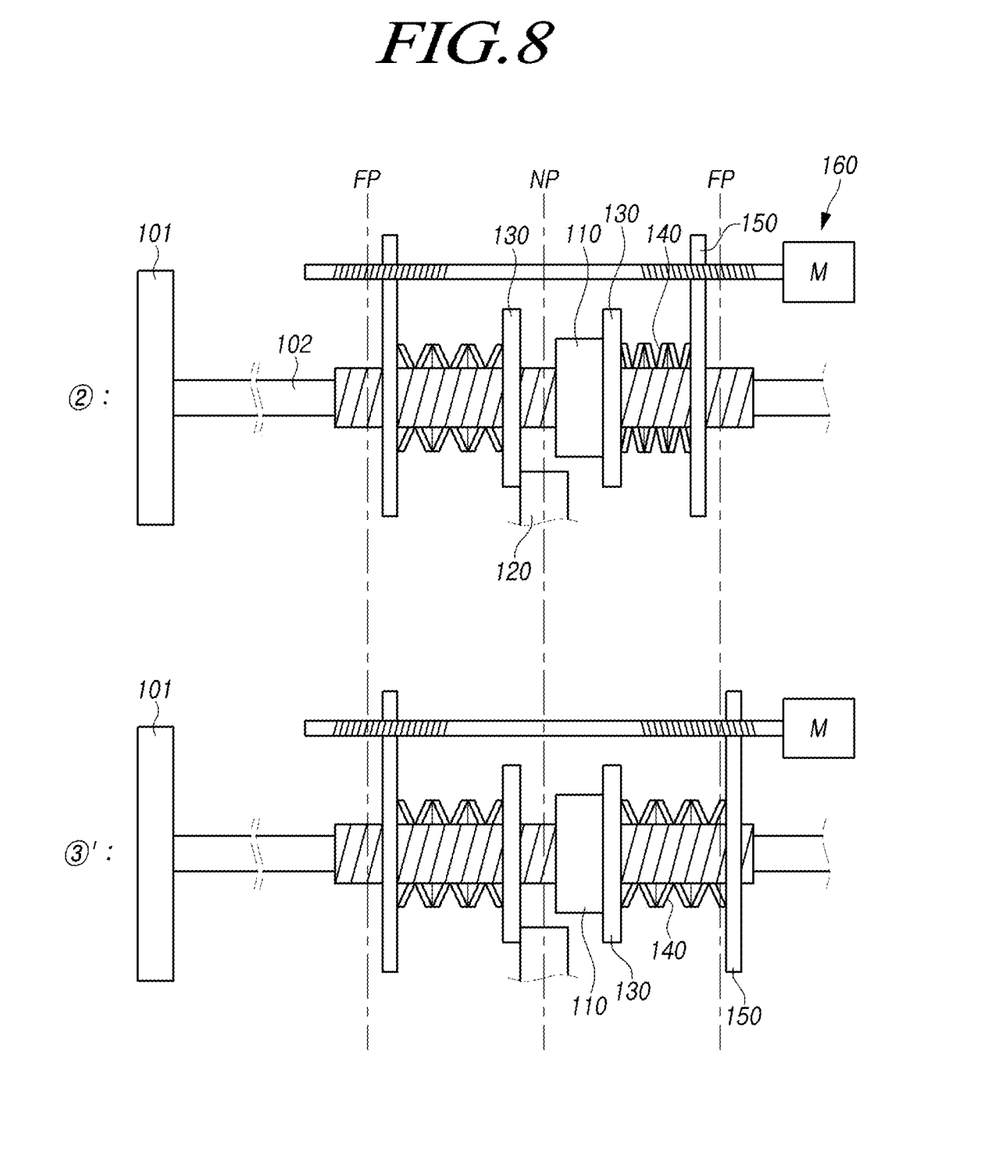

FIGS. 1 and 2 are views illustrating a steer-by-wire steering device according to the embodiments. FIG. 3 is a graph illustrating comparison between the steering reaction force and the elastic force of a degressive rate spring in a conventional steering device. FIGS. 4, 5, and 6 are views illustrating a graph of the steering reaction force and operation states according to an operation example of a steer-by-wire steering device according to the embodiments. FIGS. 7 and 8 are views illustrating a graph of the steering reaction force and operation states according to an operation example of a steer-by-wire steering device according to the embodiments.

According to the embodiments, a steer-by-wire steering device 100 includes a steering shaft 102 connected with a steering wheel 101 and having a lead screw 103, a nut 110 coupled to the lead screw 103, a pair of first supporting members 130 individually provided at opposite sides of the nut 110 to be axially slidable, a pair of second supporting members 150 axially spaced apart from opposite sides of the pair of first supporting members 130, with the pair of first supporting members 130 disposed therebetween and provided to be axially slidable, an elastic member 140 provided between adjacent ones of the first supporting members 130 and the second supporting members 150, a stopper 120 positioned between the pair of first supporting members 130 and axially fixed, and a driver 160 coupled with the second supporting members 150 and axially sliding the second supporting members 150 by control of an electronic control unit 170.

The nut 110, the first supporting members 130, and the second supporting members 150 are axially slid by the driver's manipulation of the steering wheel 101 or by controlling the driver 160 by the electronic control unit 170 and, although not illustrated in the drawings, may be coupled to a housing by a bushing, key-keyway, pin-pin hole, or serrations to be circumferentially fixed while being axially slidable smoothly.

Referring to FIG. 1, the lead screw 103 is provided on the steering shaft 102 and is coupled with the nut 110. As described above, the nut 110 is circumferentially fixed to the housing but is axially slidable. Thus, when the steering shaft 102 is rotated by the driver's manipulation of the steering wheel 101, the nut 110 engages with the lead screw 103 and axially slides.

FIG. 1 illustrates a neutral state in which the steering wheel 101 is not rotated. The nut 110 is in a neutral position free from a slide.

The pair of first supporting members 130 are individually provided on two opposite sides of the nut 110 and are axially slid while being supported on the nut 110 when the nut 110 slides.

The pair of second supporting members 150 are provided axially outside of the first supporting members 130. In other words, the first supporting members 130 and the nut 110 are positioned between the second supporting members 150.

The second supporting members 150 are axially slid by the driver 160 and, unless the driver 160 is driven, the second supporting members 150 are axially fixed.

The first supporting members 130 and the second supporting members 150 each may be shaped substantially as a disk. The first supporting members 130 and the second supporting members 150 have holes formed in the central portions thereof to be penetrated by the steering shaft 102.

The elastic member 140 is provided between the first supporting member 130 and the second supporting member 150 and, as the nut 110 slides, the elastic member 140 is compressed between the first supporting member 130 and the second supporting member 150. The elastic force of the elastic member 140 is applied to the nut 110, providing a reaction force to the driver and hence allowing for better or more comfortable manipulation of the steering wheel.

In this case, as the electronic control unit 170 controls the driver 160 to axially slide the second supporting member 150, the amount of compression of the elastic member 140 is adjusted, so that the reaction force transferred to the driver may be adjusted. The electronic control unit 170 is connected to a vehicle speed sensor (not shown) and an angle sensor (not shown) to control the driver 160 based on the vehicle speed and the steering wheel rotation angle. This is described below in detail.

A stopper 120 that is axially fixed is provided between the first supporting members 130. Thus, when the nut 110 is slid to an axial first side or an axial second side (e.g., the side opposite to the first side), the first supporting member 130, which is provided on the axial first or second side of the nut 110, is slide together with the nut 110 while being supported on the nut 110. However, the first supporting member 130, which is provided on the axial second or first side of the nut 110, is supported on the stopper 120 and spaced apart from the nut 110.

In other words, when the nut 110 slides, one of the first supporting members 130 is spaced apart from the nut 110 by the stopper 120, and only one of the elastic members 140 exerts an elastic force to the nut 110.

Thus, when the electronic control unit 170 controls the driver 160 to slide the second supporting member 150 so as to adjust the elastic force of the elastic member 140, it may suffice to consider only the elastic force of the elastic member 140, which provides the elastic force to the nut 110, of the two elastic members 140, may be considered, without the need for considering the elastic force of the other elastic member 140. Thus, convenience is attained.

The stopper 120 preferably has the same length as the nut 110.

Assuming that the stopper 120 has a smaller axial length than the nut 110, e.g., when the nut 110 slides to the axial first side, the first supporting member 130 provided on the axial second side of the nut 110 may exert elastic force while being supported on the nut 110 until before it is supported by the stopper 120 and spaced apart from the nut 110, in which case it may be hard to provide an appropriate steering feel to the driver.

If the stopper 120 has a larger axial length than the nut 110, the nut 110 is not fixed between the two first supporting members 130 supported by the stopper 120, so that the steering wheel 101 may be freely turned within a predetermined range. For example, when the nut 110 slides to the axial first side, no elastic force is applied to the nut 110 until it is supported on the first supporting member provided on the axial first side of the nut 110 in the neutral position and, when the nut 110 is supported on the first supporting member 130, reaction force may be abruptly transferred to the driver, deteriorating the steering feel.

Thus, it is preferable that the stopper 120 is formed in the same length as the nut 110 in the axial direction so that when the nut 110 slides to the axial first side, elastic force is immediately applied from the elastic member 140 on the first side while being immediately spaced apart from the first supporting member 130 on the second side.

Subsequently, as described above, the driver 160 is driven by the control of the electronic control unit 170 and slides the second supporting members 150. The driver 160 may include a bolt 161 screwed with the second supporting members 150 and a motor 162 for rotating the bolt 161.

In other words, similar to the lead screw 103 and the nut 110, the bolt 161 is screwed with the second supporting members 150, and the second supporting members 150 are axially slid by the rotation of the bolt 161.

The motor 162 is connected to the electronic control unit 170 and rotates the bolt 161 under the control of the electronic control unit 170 to thereby adjust the axial position of the second supporting members 150.

Although the drawings illustrate an embodiment in which the motor shaft of the motor 162 is directly coupled to the bolt 161, the motor shaft of the motor 162 may be coupled to the bolt 161 by a decelerator without limitations thereto.

As described below, one or two motors 162 are provided and controlled by the electronic control unit 170. In this case, it may be enough for the motor 162 to have an output capable of sliding the second supporting members 150. In particular, since the torque of the motor 162 is decelerated by the screwing between the bolt 161 and the second supporting members 150 to slide the second supporting members 150, it is possible to provide comfortable manipulation of the steering wheel 101 to the driver despite using a low-power motor as compared with the motor for applying torque to the steering shaft to provide reaction force as used in conventional steering devices, according to the embodiments.

Referring to FIG. 1, one bolt 161 may be provided and be coupled to both the second supporting members 150. In other words, the bolt 161 may have a first screw part 163, which is coupled with one of the second supporting members 150, and a second screw part 164, which is coupled with the other second supporting member 150.

The first screw part 163 and the second screw part 164 may be threaded in opposite directions, so that when the bolt 161 is rotated, both the second supporting members 150 are slid in opposite directions to each other.

In other words, since both the second supporting members 150 slide symmetrically, the electronic control unit 170 may conveniently control the motor 162 regardless of whether the driver turns the steering wheel 101 to the left or to the right.

Alternatively, as illustrated in FIG. 2, the driver 160 may include a first bolt 161a coupled to either of the second supporting members, a second bolt 161b coupled to the other second supporting member, a first motor 162a for rotating the first bolt 161a, and a second motor 162b for rotating the second bolt 161b. Regardless of the threaded directions of the first bolt 161a and the second bolt 162b, the two second supporting members 150 may be slid in opposite directions depending on the directions in which the first motor 162a and the second motor 162b rotate the first bolt 161a and the second bolt 162b, respectively.

The electronic control unit 170 may control only one of the two motors 162 depending on the turning direction of the steering wheel 101, providing a better steering feel to the driver.

As described above, according to the embodiments, the first supporting members 130, the second supporting members 150, and the elastic members 140 are provided to give the driver a reaction force, thereby enhancing the manipulation of the steering wheel. To provide the sensation of reaction force similar to that of the conventional steering device, the elastic members 140 may be degressive rate springs in which the increase in elastic force decreases as the displacement increases.

The elastic members 140 which are degressive rate springs may be, e.g., a plurality of disc springs arranged axially.

Referring to FIG. 3, the graph denoted by reference number 301 represents the steering reaction force according to the steering wheel rotation angle at a constant vehicle speed in a conventional steering device, and the graph denoted by reference number 302 represents the elastic force according to the displacement of the degressive rate spring.

In other words, according to the embodiments, since the rotation angle of the steering wheel 101 corresponds to the displacement of the elastic member 140, and the steering reaction force corresponds to the elastic force of the elastic member 140, it is possible to provide the driver with a similar sensation of reaction force to that of the conventional steering device through the degressive elastic force and the slide of the second supporting members 150 using the similarity between the curve of the graph 301 and the graph 302.

The electronic control unit 170 controls the driver 160 so that the second supporting member 150 is located in a first position or a second position.

Specifically, with respect to the neutral position which is the position of the nut 110 in the neutral state where there is no turn of the steering wheel 101, the electronic control unit 170 controls the driver 160 to allow the second supporting member 150 to be in the first position where the axial distance from the neutral position is relatively close if the rotation angle of the steering wheel 101 increases and, if the rotation angle of the steering wheel 101 reduces, the electronic control unit 170 controls the driver 160 to allow the second supporting member 150 to be in the second position where the distance from the neutral position is relatively far.

When the rotation angle of the steering wheel 101 increases refers to when the steering wheel 101 turns left or right in the neutral state and when the steering wheel 101 turned left and right is turned in the direction opposite to the direction toward the neutral state.

When the rotation angle of the steering wheel 101 reduces refers to when the steering wheel 101 turned left or right is turned toward the neutral state.

The first position and second position of the second supporting member 150 are not fixed positions with respect to the neutral position but may be varied depending on the vehicle speed as described below.

The first position is a position where the distance between the first supporting member 130 and the second supporting member 150 is smaller than the free length of the elastic member 140, in the neutral state.

The second position is a position where the distance between the first supporting member 130 and the second supporting member 150 is larger than the free length of the elastic member 140, in the neutral state.

In other words, referring to FIGS. 5 and 6, the vertical line denoted by reference denotation NP refers to the neutral position of the nut 110, and the vertical line denoted by reference denotation FP refers to the position (hereinafter, a 'free position') of the second supporting member 150, spaced apart from the first supporting member 130 by the free length of the elastic member 140 in the neutral state. The first position is closer to the neutral position NP than the free position FP, and the second position is farther from the neutral position NP than the free position FP.

The operation structure of the embodiments is described below with reference to FIGS. 4 to 8. However, for ease of description and illustration, the description focuses primarily on an example in which the steering wheel 101 turns to a first side, and the nut 110 slides to the right in the drawings. The same description may apply to the case where the steering wheel 101 turns to a second side (e.g., the side opposite to the first side) and the nut 110 slides to the left in the drawings and, thus, no description is given of the case.

However, in the graphs of FIGS. 4 and 7, as described above, when the nut 110 slides to the first or second side, the first supporting member 130 on the opposite side is supported on the stopper 120 and spaced apart from the nut 110, so that only the elastic member 140 provided in the sliding direction of the nut 110 provides elastic force to the nut 110. Given this, it should be noted in the description that the right side of the y axis denotes the elastic force provided to the nut 110 by the elastic member 140 provided on the right side of the figures, and the left side of the y axis denotes the elastic force provided to the nut 110 by the elastic member 140 provided on the left side of the figures.

The operation example illustrated in FIGS. 4 to 6 assumes a constant vehicle speed. In FIG. 4, the graph denoted by reference number 401 refers to the elastic force according to the displacement of the elastic member 140 when the second supporting member 150 is in the first position, the graph denoted by reference number 402 refers to the elastic force according to the displacement of the elastic member 140 when the second supporting member 150 is in the second position, and the graph denoted by reference number 403 refers to the elastic force of the elastic member 140 applied to the nut 110 when the steering wheel 101 turns.

In other words, the distance in the x-axis direction between the graph 401 and the origin corresponds to the distance between the first position and the reference position FP, and the distance between the graph 402 and the origin corresponds to the distance between the reference position FP and the second position.

In FIG. 4, ① and ④ refer to the neutral state, ①→② refers to a state in which the rotation angle of the steering wheel 101 increases, ②→③ refers to a state in which the rotation direction of the steering wheel 101 is changed, and ③→④ refers to a state in which the rotation angle of the steering wheel 101 decreases.

FIG. 5 illustrates the operation structure in the ①→② state, indicating a state where as the rotation angle of the steering wheel 101 increases in the neutral state, the nut 110 slides and the elastic member 140 is compressed.

At this time, since the second supporting member 150 is in the first position and thus the elastic member 140 is in a compressed state, the reaction force felt when the driver starts turning the steering wheel 101 in the neutral state increases from a predetermined initial reaction force (corresponding to the intersection of the graph 401 and the y axis), rather than 0.

The electronic control unit 170 may determine the first position according to the vehicle speed. In other words, the distance in the x-axis direction between the graph 401 and the origin may be determined according to the vehicle speed. The electronic control unit 170 sets a large distance between the first position and the free position FP if the detected vehicle speed is high and, if the vehicle speed is low, the electronic control unit 170 sets a small distance between the first position and the free position FP, thereby providing the driver with a better feeling of manipulation of the steering wheel 101.

Although the drawings illustrate an embodiment in which the first position is fixed when the nut 110 is slid, the electronic control unit 170 may control the driver 160 in a state in which the rotation angle of the steering wheel 101 increases, determining the first position according to the vehicle speed and thereby adjusting the sensation of reaction force delivered to the driver.

FIG. 6 illustrates the operating structure in the ②→③ state. When the driver rotates the steering wheel 101 in the opposite direction, the electronic control unit 170 detects the rotation and drives the driver 160 to allow the second supporting member 150 to slide from the first position to the second position.

As the second supporting member 150 slides from the first position to the second position, the elastic member 140 is stretched, so that the elastic force applied to the nut 110 by the elastic member 140 is reduced.

If the driver rotates the steering wheel 101 to the neutral state, the nut 110 is supported by the second supporting member 150 in the second position and provides an elastic force to the nut 110.

If the driver turns the steering wheel 101 back in the opposite direction to increase the rotation angle, the electronic control unit 170 controls the driver 160 to place the second supporting member 150 in the first position.

It should be noted that when the driver turns the steering wheel 101 to the opposite side beyond the neutral state, the electronic control unit 170 controls the driver 160 to place the second supporting member 150 in the first position and, in this case, the elastic member 140 applying the elastic force to the nut 110 is changed.

Similar to determining the first position according to the vehicle speed, the electronic control unit 170 may determine the second position according to the vehicle speed.

Referring to the operation example illustrated in FIGS. 7 to 8, as compared with the operation example illustrated in FIGS. 4 to 6, the interval between the first position and the second position is reduced. In other words, the distance in the x-axis direction between the origin and the graph 702 may be determined according to the vehicle speed.

The electronic control unit 170 sets a small distance between the free position FP and the second position if the detected vehicle speed is high and sets a large distance between the free position FP and the second position if the vehicle speed is low, thereby allowing the driver a better sensation of manipulation of the steering wheel 101.

Likewise, although the drawings illustrate an embodiment in which the second position is fixed when the nut 110 is slid, the electronic control unit 170 may control the driver 160 in a state in which the rotation angle of the steering wheel 101 decreases, determining the second position according to the vehicle speed and thereby adjusting the sensation of reaction force delivered to the driver.

By the so-shaped steer-by-wire steering device, it is possible to provide the driver with comfortable manipulation of the steering wheel even with a low-power motor, thus reducing costs.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

What is claimed is:

1. A steer-by-wire steering device, comprising:
   a steering shaft connected with a steering wheel and having a lead screw;
   a nut coupled to the lead screw;
   a pair of first supporting members individually provided at opposite sides of the nut to be axially slidable;
   a pair of second supporting members axially spaced apart from opposite sides of the pair of first supporting members, with the pair of first supporting members disposed therebetween and provided to be axially slidable;
   an elastic member provided between adjacent ones of the first supporting members and the second supporting members;
   a stopper positioned between the pair of first supporting members and axially fixed; and
   a driver coupled with the second supporting members and axially sliding the second supporting members by control of an electronic control unit.

2. The steer-by-wire steering device of claim 1, wherein the first supporting members and the second supporting members is penetrated by the steering shaft.

3. The steer-by-wire steering device of claim 1, wherein the nut and the stopper have axially the same length.

4. The steer-by-wire steering device of claim 1, wherein the driver includes a bolt screwed with the second supporting members and a motor rotating the bolt.

5. The steer-by-wire steering device of claim 4, wherein the bolt includes a first screw part coupled with either of the second supporting members and a second screw part coupled with the other second supporting member.

6. The steer-by-wire steering device of claim 5, wherein the first screw part and the second screw part are threaded in opposite directions to each other.

7. The steer-by-wire steering device of claim 1, wherein the driver includes a first bolt coupled with either of the second supporting members, a second bolt coupled with the other second supporting member, and motors rotating the first bolt and the second bolt, respectively.

8. The steer-by-wire steering device of claim 1, wherein the elastic member is a degressive rate spring.

9. The steer-by-wire steering device of claim 1, wherein with respect to a neutral position, which is a position of the nut in a neutral state in which the steering wheel is not turned,
   the electronic control unit controls the driver to place the second supporting members in a first position in which the second supporting members are axially relatively close to the neutral position if a rotation angle of the steering wheel increases, and
   the electronic control unit controls the driver to place the second supporting members in a second position in which the second supporting members are axially relatively far from the neutral position if the rotation angle of the steering wheel decreases.

10. The steer-by-wire steering device of claim 9, wherein the first position is a position in which a distance between the first supporting members and the second supporting members is smaller than a free length of the elastic member, in the neutral state.

11. The steer-by-wire steering device of claim 10, wherein the electronic control unit determines the first position depending on a vehicle speed.

12. The steer-by-wire steering device of claim 9, wherein the second position is a position in which a distance between the first supporting members and the second supporting members is large than a free length of the elastic member, in the neutral state.

13. The steer-by-wire steering device of claim 12, wherein the electronic control unit determines the second position depending on a vehicle speed.

* * * * *